(12) United States Patent
Wessner

(10) Patent No.: US 8,437,630 B2
(45) Date of Patent: May 7, 2013

(54) UNDERWATER CAMERA HOUSING

(76) Inventor: David Howard Wessner, Virginia Beach, VA (US)

( * ) Notice: Subject to any disclaimer, the term of this patent is extended or adjusted under 35 U.S.C. 154(b) by 0 days.

(21) Appl. No.: 13/398,007

(22) Filed: Feb. 16, 2012

(65) Prior Publication Data

US 2013/0044999 A1   Feb. 21, 2013

Related U.S. Application Data

(60) Provisional application No. 61/443,354, filed on Feb. 16, 2011.

(51) Int. Cl.
*G03B 17/08* (2006.01)
(52) U.S. Cl.
USPC .................. 396/25; 396/27; 348/81

(58) Field of Classification Search ............... 396/25, 396/27, 29; 348/81
See application file for complete search history.

(56) References Cited

U.S. PATENT DOCUMENTS

| | | | | |
|---|---|---|---|---|
| 3,668,986 A | * | 6/1972 | Lemaire | 396/28 |
| D411,217 S | * | 6/1999 | McBride | D16/204 |
| 6,064,824 A | * | 5/2000 | Rink | 396/25 |
| 6,097,424 A | * | 8/2000 | Zernov et al. | 348/81 |
| 6,476,853 B1 | * | 11/2002 | Zernov et al. | 348/81 |
| 6,784,920 B2 | * | 8/2004 | Weber | 348/81 |
| 2005/0036031 A1 | * | 2/2005 | Weber | 348/81 |
| 2008/0253756 A1 | * | 10/2008 | Gourova | 396/27 |

\* cited by examiner

*Primary Examiner* — Clayton E Laballe
*Assistant Examiner* — Warren K Fenwick

(57) ABSTRACT

A camera housing for underwater use comprising a turbulence-reducing design, a recess for mounting a camera, attachment means, and stabilizing outer shell and keel design.

3 Claims, 5 Drawing Sheets

UNDERWATER CAMERA HOUSING

This invention claims the benefit of the filing date of U.S. Provisional Patent Application No. 61/443,354, filed on Feb. 16, 2011

FIELD OF THE INVENTION

The present invention relates generally to an apparatus for utilizing with an underwater camera device. More particularly, the present invention is an underwater video camera housing which can suspend from a watercraft and record underwater views.

BACKGROUND OF THE INVENTION

Conventional means of underwater recording requires using a video camera with a removable head; the cabling, boat-mounted power supply, monitoring and recording equipment all connect to the video camera through the removable head.

In order to record video, the user (whether it is the boat operator, research or fishing crew, or the like) must employ a bulky power supply and video cable between the underwater camera and the support and operation equipment located on the boat. This generally includes boat-mounted ancillary recording devices, operation interface and/or computer equipment, and other equipment such as mobile communications devices. However, the current configurations are complicated and will limit a user's ability to orient the underwater camera as a result of the bulk and amount of connecting wires and equipment, as well as fishing lines, lures, or bait to traverse along with one's watercraft while simultaneously recording desired views. The power supply and video cable, while interfering with control over the orientation of the device, will also frequently interfere with the lens of the camera, partially or completely blocking the view. The same is true regardless of whether the camera is a still or video camera, and regardless of whether, such as with a multi-function video camera, the video camera is being utilized to capture still images or video.

Prior devices are, in addition, generally unstable. Such devices have incorporated a top-mounted tether point or audio/video cable produce detrimental drag and resistance through the water that must be offset with large fins or other stabilization devices in their design. Previous devices also have a tendency to become less stable as speed increases due to the increased drag along the length of the top-mounted cable being pulled through the water, rendering them less suitable for a range of intended trolling speeds.

In addition, specialized underwater cameras which utilize power and communication cables are more complicated and expensive to manufacture and are therefore more expensive for the end user. Specialized equipment and designs are necessary to provide watertight connections between the camera and the vessel so that the power and communication cables can withstand the stresses involved, particularly while towing the camera during trolling operations.

It is therefore an object of the present invention to introduce an underwater camera housing which eliminates the interferences inherent in the current power and communication cabling systems and connections.

It is a further object of the present invention to provide an underwater camera housing that is utilized with commercially-available self-contained image recording equipment.

It is a further object of the present invention to provide a more robust underwater camera housing that provides a longer-lasting and more resilient housing to mount, stabilize, and protect a camera while in use underwater.

SUMMARY OF THE INVENTION

The device includes:
a housing assembled from component parts and processes with an opening for receiving and mounting a camera;
an attached keel weight which is bottom-mounted along the horizontal axis of the device, with the weight of the keel weight chosen for stability and negative buoyancy;
an internal buoyancy-biased insert to facilitate horizontal orientation;
a mount to secure a camera within the housing; and
a connection means located on the forward end of the device, the connection means utilized to attach a support or towing line from a boat, ship, or other type of vessel.

The mount is located inside the rear housing opening so that a camera is fixedly attached inside the housing and thereby protected from friction, shock and impact damage. Further, the rearward-facing position of the camera provides the optimal view for such things as observing fish interest and strikes on various types of fishing rigs and baits. In addition, the design of the housing is such that, with the camera affixed inside the housing in the rearward-facing position, the turbulence and other interferences associated with pulling imaging equipment through the water are reduced in significant part.

Generally available camera units are designed with their own waterproof housing and are self-contained, utilizing an internal battery and a data recording memory card to record digital images or video for viewing and playback later. This design eliminates the need for a separate video and power supply cable between the vessel and the device during use, affording quicker deployment and recovery of the unit and less interference with the conduct of fishing and safe boating operation.

Although the device is designed to eliminate the need for any power or communication connection between the camera and the vessel, it will be understood that many underwater cameras have available signal-out connections, even though the power supply for the camera is self-contained. A simple run of cable, connected to the camera and strapped by conventional means to the tow line, can be utilized to provide real-time data viewing and capture while still avoiding the need for bulky and entangling power cables.

DETAIL DESCRIPTIONS OF THE INVENTION

Figure 1:
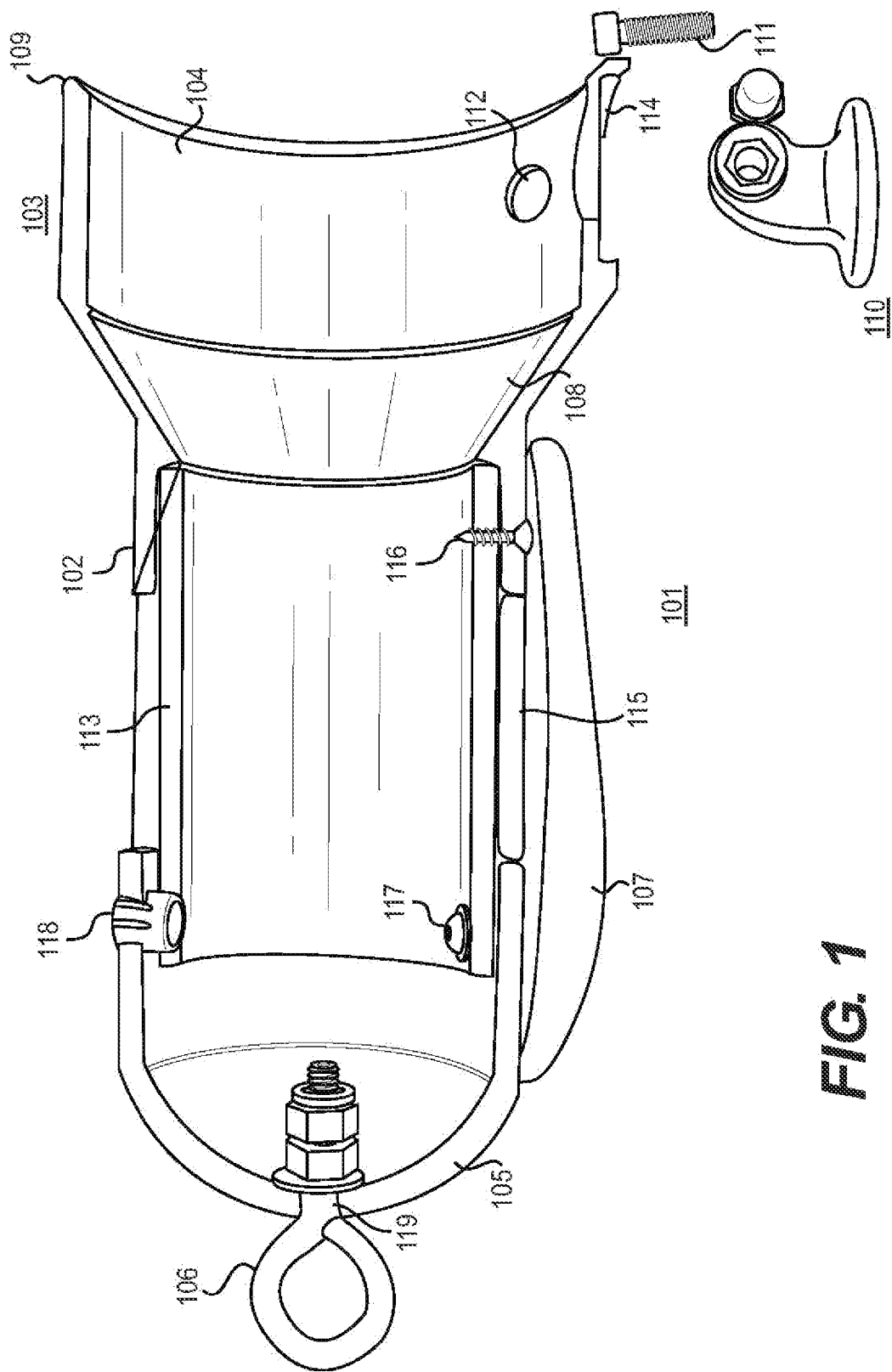
FIG. 1 is a cutaway lateral view of an embodiment of the present invention showing a connection means on an end of a housing.

Referring now to FIG. 1, an exterior view of an embodiment of the present invention is shown. The housing 101 comprises a tubular portion 102, a rear portion 103 that has a larger circumference than the tubular portion 102, with an opening 104 in the rear portion 103. The front portion 105, which is distal to the rear portion 103, is closed and preferentially rounded. The front portion 105 further comprises attachment means 106. The attachment means 106 is utilized to attach a towing or hanging line (not shown). The attachment means 106 is shown as a loop of metal, but it will be understood that the attachment means may be constructed of any material and any shape utilized in the art to attach towing and hanging lines to submersible equipment. It will be further understood that the invention is intended to be useful for towing by a watercraft; as such, attachment means 106 that are well known in the art for towing equipment and devices from watercraft, and may include fixed or swivel connections and the like. The tubular portion 102 and the rear portion 103 are joined by a flared portion 108, wherein the flared portion 108 continuously joins the tubular portion 102 and the rear portion 103, with the diameter of the flared portion 108 increasing from the diameter of the tubular portion 102 to that of the rear portion 103.

Figure 2:
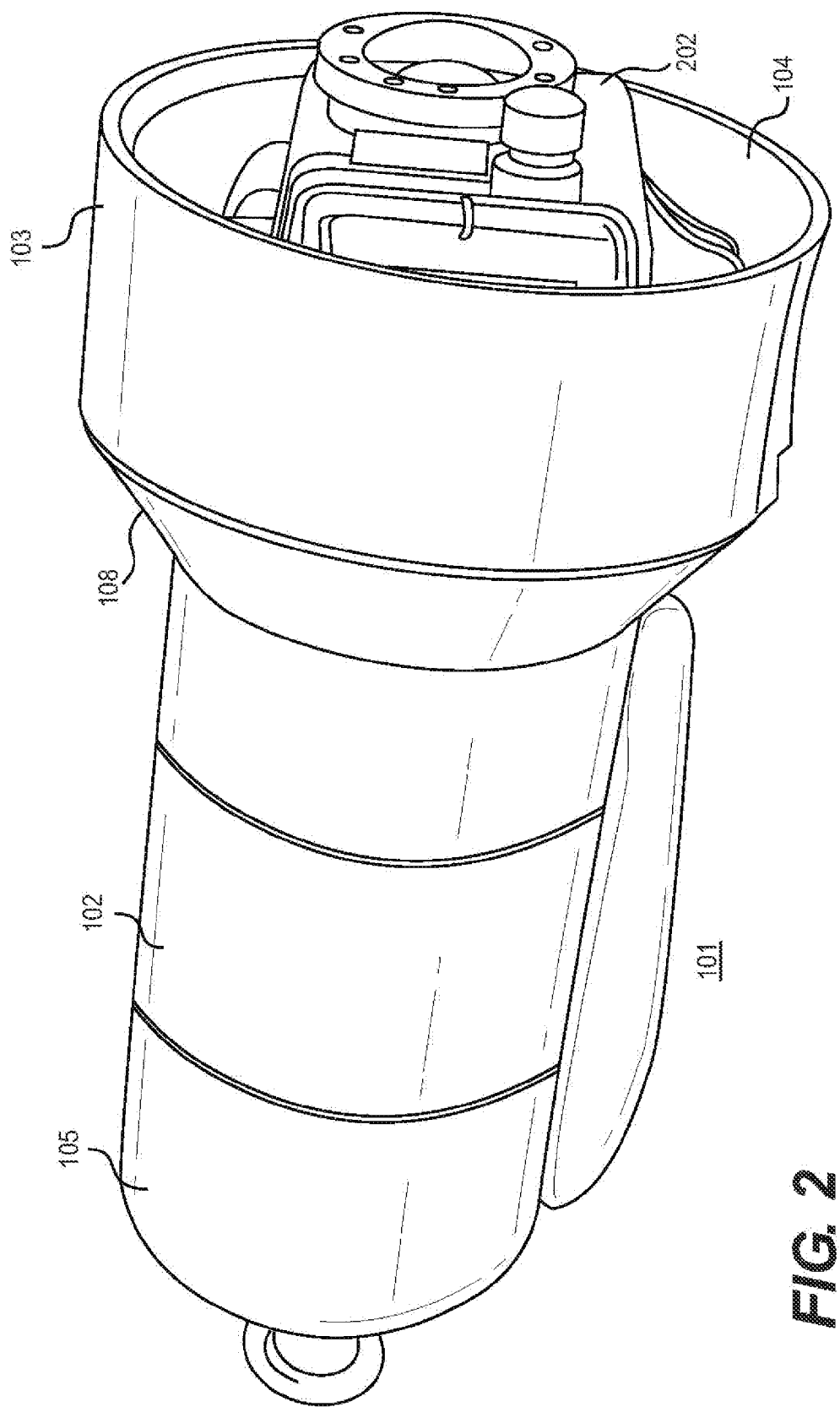
FIG. 2 is an exterior perspective view of an embodiment of the present invention showing a camera mounted in a housing.
Figure 3:
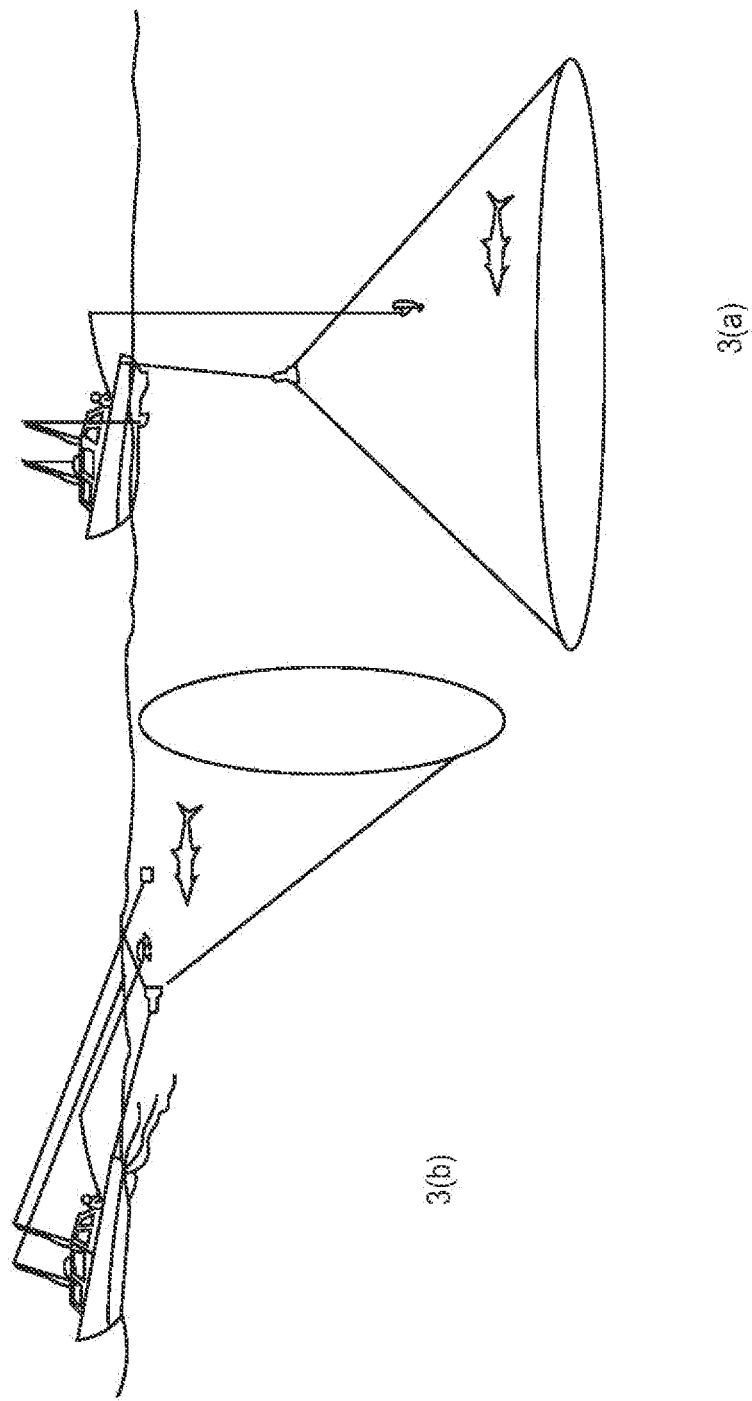
FIG. 3 is a drawing of the present invention, demonstrating its use and attachment to a watercraft.

The housing 101 utilizes an asymmetrical closed cell foam insert FIG. 3, 301 inserted longitudinally inside the tubular portion 102 to assist in maintaining proper orientation and roll stability of the assembly during trolling. A notch section FIG. 3, 302 in the closed cell foam insert 301 is oriented towards the bottom portion of the housing 101 where a keel weight 107 is affixed to the housing 101 in the horizontal plane. The placement of the notch section 302 in relation to the keel weight 107 results in a buoyancy bias towards the top (relative to the keel weight 107) of the housing 101. The closed cell foam insert 301 contains a plurality of air cells which become compressed as the depth of the device in the water increases, resulting in slightly more negative buoyancy at depth. The device's rounded front portion 105 and the larger diameter rear portion 103, with the tubular portion 102 and the flared portion 108 connecting the front portion 105 and the rear portion 103, provides hydrodynamic stability of the assembly while the device is being utilized for trolling. Further, the configuration of the device 101 reduces the turbulence behind the device that normally would degrade a clear view through the water by the rear-facing camera because, when trolled through the water the rounded shape and rear flare produces uniform water pressures around the outside of the device as water flows over the flared portion 108 and the rear section 103. Under normal conditions, turbulent flow over the device would produce a turbulence effect at the trailing edge 109 of the device, causing the view of the camera (FIG. 2, 202) mounted within the opening 104 at the rear portion 103 to be obscured. The combined shape of the front portion 105, the tubular portion 102, the flared portion 108 and the rear portion 103 of the device produces a Bernoulli and Kutta Condition effect the fluid (water) flows from the front portion 105 towards and over the tubular portion 102, the flared portion 108, and the rear portion 103. The fluid (water) velocity increases over the longer surface area of the curved shape of the device as it moves through the water resulting in a lower fluid pressure area.

The device 101 is circular in cross-section throughout the entirety of its length; the circular cross section in combination with the increase in the diameter of the device from the front portion 105 to the rear portion 103 operates to essentially equalize the pressures along the length of the device except as further described below by the effect of the keel weight 107. The essentially equal pressure along the surface of the device while in towing operation serves to increase the stability of the device, thus increasing the stability of the transmitted images.

The Kutta condition produced at the relatively sharp edges at the trailing edge 109 of the device creates a uniform stagnation point where the pressures again return (increase) to normal, thereby reducing turbulence behind the device 101.

To maintain the correct orientation of the device while in operation, the keel weight 107 is affixed to the bottom portion of the device 101. The keel weight 107 preferentially comprises a half "tear-drop" shape wherein the portion of the keel weight 107 located closest to the front portion 105 of the device 101 increases in diameter around the circumference of the keel weight 107 for approximately the first 25% of the length of the keel weight 107, then the keel weight 107 circumference decreases towards the portion of the keel weight 107 located closest to the end portion 103 of the device 101. The same low pressure Bernoulli Effect detailed above, results as water flows over the Formed Lead Keel shape on the bottom of the device which adds to the horizontal, bottom-down stabilization. As trolling speed increases to the designed limits, the stabilization effect increases proportionately. A smooth, curving shape to the keel weight 107 is preferred to reduce friction and turbulence, but it will be understood that there are keel weight designs well known in the industry that deviate from the particular shape shown herein, and utilizing any keel weight shape that performs the same stabilizing function but deviates from this design may be used without deviating from the scope and spirit of the invention herein. The design and implementation of the keel weight 107 as described herein ensures the device remains correctly oriented horizontally in the water when being trolled. Trolling tests show that, in comparison testing against prior art designs, vessel speeds over 5 knots resulted in severe oscillation and in some cases spinning of the top-tethered cameras and other prior designs when they were otherwise employed as directed. Testing of an embodiment of the present invention utilizing a centered, front tethered design along with the formed lead keel and shape disclosed herein demonstrated exceptional stability and overall performance at intended trolling speeds and up to 10 knots. Higher trolling speeds are expected to have similar results, and the invention as described herein is stable and useful at a wide range of trolling speeds.

Figure 4:
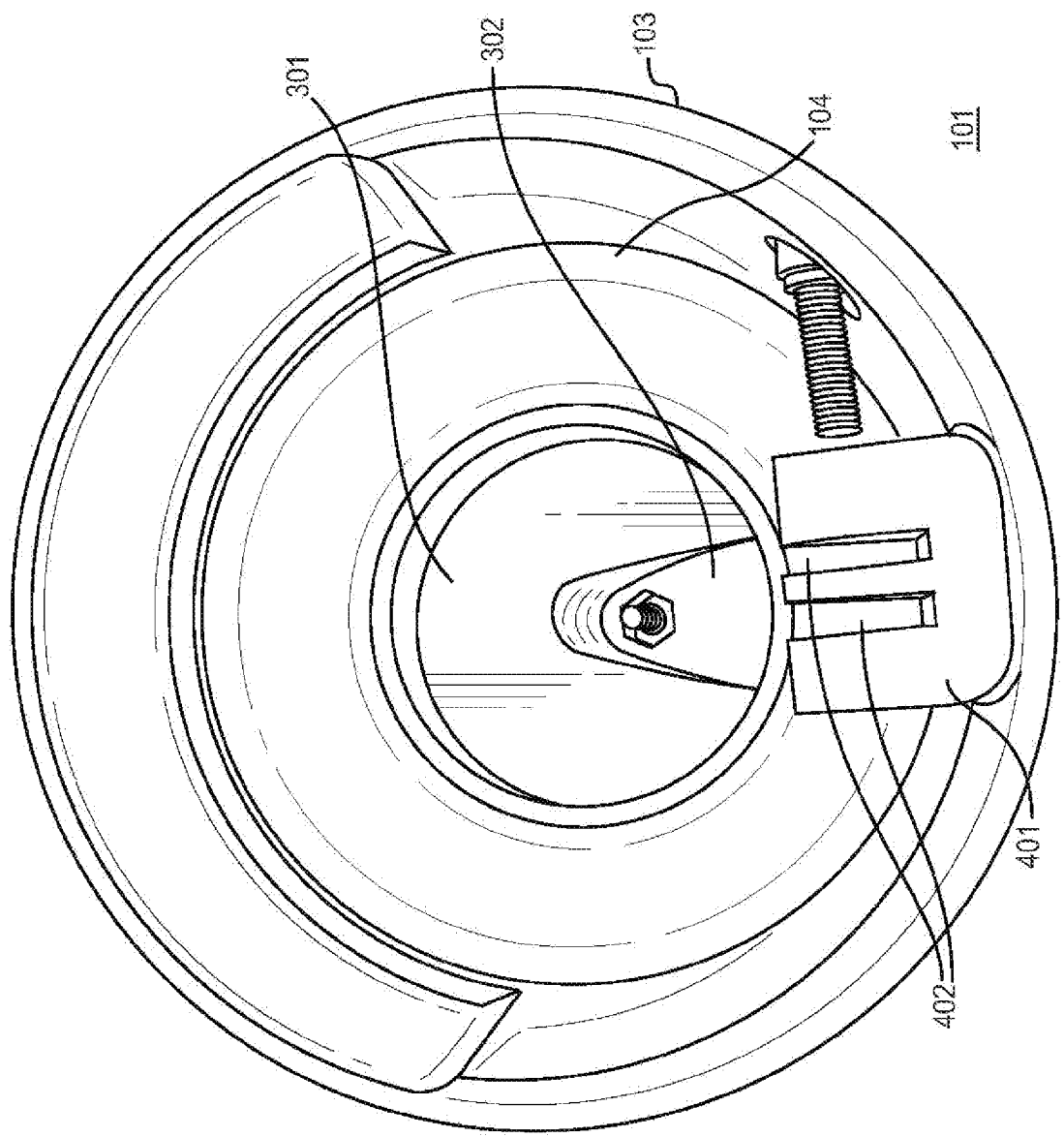
FIG. 4 is a view of the present invention showing an embodiment of the camera mount.
Figure 5:
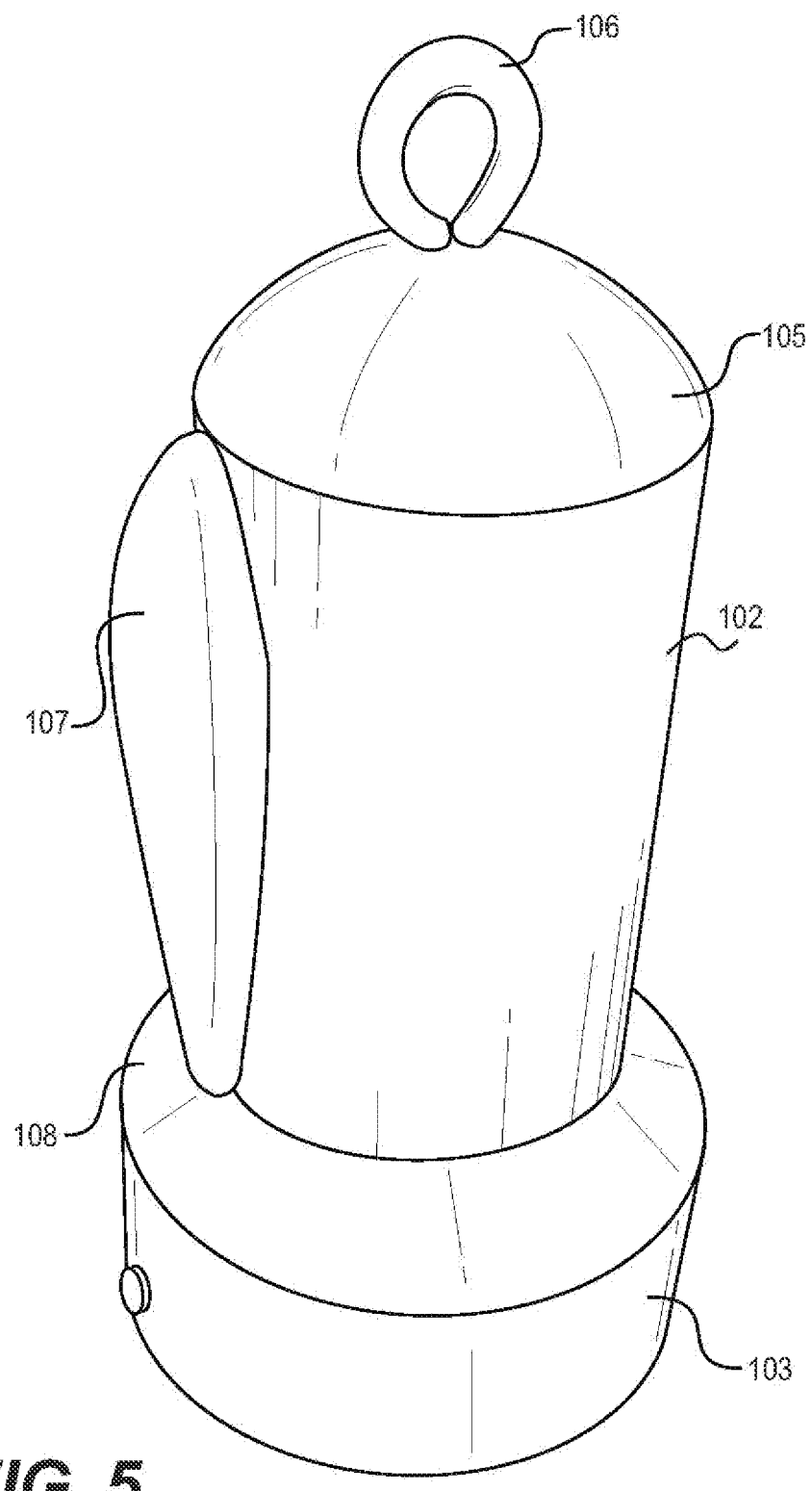
FIG. 5 is an exterior perspective view of an embodiment of the present invention showing a connection means on an end of a housing.

The camera FIG. 2, 202, is generally a commercially-available watertight camera that may be various formats and may be still or video, but is preferentially a video camera that may be set to record continuously while the device is in use. The camera 202 is mounted inside of the opening 104 in the rear portion 109 of the device, affixed to the device by a universal mount 110. A set screw 111 is inserted through the side opening 112 in the device, and the set screw 111 tightened through the camera housing and the universal mount 110. It will be understood that numerous designs of camera mounts may be utilized; a preferred design is shown in FIG. 4 at 401 wherein the plurality of slots 402 provide for greater stability of the camera 202. The universal mount 110, 401 is affixed to the bottom portion of the interior of the rear portion 103, and the universal mount is preferentially affixed by means well known in the industry (i.e., by mechanical means such as screw or by suitable adhesive means) and/or by utilizing a recess 114 configured within the outer perimeter of the rear portion 103.

The present invention may also be utilized when the vessel is at rest or drifting by lowering the device straight down through the water to video or photograph downward below the assembly, employing it as a "drop camera" housing as depicted in the FIG. 3(*a*) as opposed to a trolling use as shown in FIG. 3(*b*). In the vertical usage FIG. 3(*a*) the shape of the device 101 and the keel weight 107 now serve to provide a consistent orientation and stabilization along the vertical axis of the assembly relative to water current or boat drift.

An example of the assembly of the device as described herein is as follows: the primary assembly depicted in FIG. 1 is constructed by joining three individual components both adhesively and mechanically to a fourth inner connecting sleeve 113 which fits into the recesses inside the front portion 105 and flanged portion 108.

Prior to final bonding of the front portion 105 and the rear portion 103 to the sleeve 113, a spacer 115 is slid over and bonded to the 113; the spacer 115 provides the desired overall device length when inserted between the front portion 105 and the rear portion 103 with no resulting gap between components. After dry-fitting to ensure proper fit, the front and rear portions 105 and 103 are secured in place. The flared portion 108 and the sleeve 113 are connected at 116. The front section is secured at 117 with standard connecting means; i.e., stainless steel bolt which further connects into the keel weight 107. An access hole 118 is provided to allow insertion of a tool to tighten the internal hardware. The access hole 118 may be covered after final assembly. Prior to fastening, the keel weight 107 is drilled to accept a threaded brass expansion-type insert which is then hydraulically pressed into the drilled hole in the keel weight 107. The outer surface of the keel weight may be then dip coated with a heat-cured plastic layer. The keel weight 107 is now attached to the assembly. A bead of permanent, waterproof marine adhesive may applied between the bottom of the device and the inside surface of the keel weight 107 before final tightening, further bonding the keel weight 107 in place. A stainless steel ring eye is through-bolted and secured with a stainless steel washer, stainless steel hex nut, and a second stainless steel locking hex nut to the front portion 105, through a pre-drilled hole 119 centered at the front of the device. The rear portion 103 has a stepped, milled recess hole 114 which accepts insertion of the universal mount 110.

While the assembly of the present invention has been described herein utilizing bonding and other methods related to plastic or similar materials, it will be understood that the present invention may be molded, forged, and/or assembled utilizing many types of materials and techniques that are well known in the industry, and the references to materials in this description should not be understood to be limiting. It will further be understood, as discussed above, that the assembly of the attachment means 106 may be by other means, including non-invasive adhesive or single-molded design without deviating from the scope and spirit of this invention.

What is claimed is:

1. A housing assembled from component parts and processes with an opening for receiving and mounting a camera;
   an attached keel weight which is bottom-mounted along the horizontal axis of the device, with the weight of the keel weight chosen for stability and negative buoyancy;
   an internal buoyancy-biased insert to facilitate horizontal orientation;
   a mount to secure a camera within the housing; and
   a connection means located on the forward end of the device, the connection means utilized to attach a support or towing line from a boat, ship, or other type of vessel.

2. The housing of claim 1 wherein the housing is constructed of plastic or other material.

3. The housing of claim 1 wherein the camera is contained within a cavity located at the rear of the housing such that, when the housing is being towed through the water by a watercraft, the camera can record images looking back along the path behind the watercraft.

* * * * *

UNITED STATES PATENT AND TRADEMARK OFFICE
CERTIFICATE OF CORRECTION

PATENT NO.         : 8,437,630 B2                             Page 1 of 1
APPLICATION NO.    : 13/398007
DATED              : May 7, 2013
INVENTOR(S)        : David Howard Wessner It is certified that error appears in the above-identified patent and that said Letters Patent is hereby corrected as shown below:

Title Page, insert after (56) * Cited by Examiner
    Item 74-- Attorney, Agent or Firm - Byers Law Group; Duncan G. Byers --

Signed and Sealed this
Eighteenth Day of June, 2013

Teresa Stanek Rea
*Acting Director of the United States Patent and Trademark Office*